(12) United States Patent
Stephenson, Jr.

(10) Patent No.: US 9,573,197 B1
(45) Date of Patent: Feb. 21, 2017

(54) MAGNETIZED DRILL ACCESSORY FOR RETENTION OF OBJECTS

(71) Applicant: Samuel S. Stephenson, Jr., Boca Raton, FL (US)

(72) Inventor: Samuel S. Stephenson, Jr., Boca Raton, FL (US)

( * ) Notice: Subject to any disclaimer, the term of this patent is extended or adjusted under 35 U.S.C. 154(b) by 673 days.

(21) Appl. No.: 13/967,325

(22) Filed: Aug. 14, 2013

Related U.S. Application Data

(60) Provisional application No. 61/743,662, filed on Sep. 10, 2012.

(51) Int. Cl.
    *B23B 45/00*     (2006.01)

(52) U.S. Cl.
    CPC .................... *B23B 45/003* (2013.01)

(58) Field of Classification Search
    CPC ....... B23B 45/003; B23B 49/00; B25H 3/003; B25F 5/00; B25F 5/029; B65D 85/28; B65D 85/24; B65D 85/20
    USPC .......... 224/183; 335/285, 306, 303; 206/818
    See application file for complete search history.

(56) References Cited

U.S. PATENT DOCUMENTS

| | | | | |
|---|---|---|---|---|
| 3,629,756 A | * | 12/1971 | Holtz | H01F 7/0215 101/389.1 |
| 6,401,253 B2 | * | 6/2002 | Brunson | A41D 19/01594 2/160 |
| 2007/0059114 A1 | * | 3/2007 | Grimes, II | B25F 5/029 408/238 |
| 2007/0175785 A1 | * | 8/2007 | Sharp | B25F 5/029 206/373 |

* cited by examiner

*Primary Examiner* — Robert Long
*Assistant Examiner* — Xavier A Madison
(74) *Attorney, Agent, or Firm* — Allen D. Hertz, P.A.; Allen D. Hertz

(57) ABSTRACT

A magnetized material is affixed to an exterior of a drill housing of a portable power drill or a battery pack used for providing power to the portable power drill. The magnetized material is employed to retain magnetic objects. The magnetized material can be provided in a planar sheet or upon a three-dimensionally shaped form. In a sheet configuration, the magnetized object retention panel is defined by a magnetized surface and an opposite, attachment surface. A series of grooves can be formed within the magnetized material enabling conformation of the sheet to a non-planar surface on the drill or battery pack. The three-dimensionally shaped form can be provided as a channel having at least one channel sidewall extending generally perpendicular from an edge of a channel basewall terminating at a base surface. Inclusion of a pair of sidewalls provides a planar supporting surface for standing the drill upright.

20 Claims, 9 Drawing Sheets

MAGNETIZED DRILL ACCESSORY FOR RETENTION OF OBJECTS

CROSS-REFERENCE TO RELATED APPLICATION

This application is a Non-Provisional Application claiming the benefit of U.S. Provisional Patent Application Ser. No. 61/743,662, filed on Sep. 10, 2012, which is incorporated herein in its entirety.

FIELD OF THE INVENTION

The present invention relates to a drill accessory, and more particularly, a magnetized retention member that is adhesively attached to a portably power drill for temporarily retaining magnetic objects, such as drill bits, driver bits, screws, bolts, nuts, rivets, and the like.

BACKGROUND OF THE INVENTION

Drills are used for any of a variety of applications, including forming or enlarging holes through objects, forming countersinks, installing or securing threaded fasteners, or any other process utilizing a rotational motion. Because of the flexibility of the drill, there are many scenarios where the drill is used for multiple functions during the same time frame. It is common to need different objects to complete the task at hand. One example would be a process of drilling pilot holes and installing a series of screws, where the individual would need a drill bit, a driver bit, and the series of screws. The problem is retaining the drill bit, the driver bit, and the series of screws throughout the various steps required for completing the task. One known method would be to retain the objects in a pocket. This takes additional time to retrieve the objects from within the pocket. Sharp objects, such as screws, can be uncomfortable, or even cause injury to the individual, thus creating an undesirable scenario.

Another, even less desirable scenario, is to temporarily hold the objects in one's mouth. This solution introduces additional potential health risks including illness from ingesting bacteria or other contaminants residing on the surface of the objects or injury from swallowing the objects.

Some portable drills include a retention element having specifically shaped receptacles for temporarily retaining tools, such as screw driver bits, a driver bit extension, and the like. This solution is limited in that the retention element is designed to hold a specific object having a specific shape and size. This solution fails to provide accommodations for retaining a broader selection of tools including drill bits, nut drivers, and the like; fasteners, such as screws, bolts, nuts, washers, and the like; and other objects that might be used during completion of a task.

Accordingly, there remains a need in the art for a device that can temporarily retain objects while completing a task that employs a power tool, such as a portable power drill.

SUMMARY OF THE INVENTION

The present invention overcomes the deficiencies of the known art and the problems that remain unsolved by providing a method and respective apparatus for temporarily retain objects while completing a task that employs a power tool, such as a portable power drill.

In accordance with one embodiment of the present invention, the invention includes an accessory attached to a portable power drill, the combination comprising:

a magnetized object retention panel comprising:
a substrate having an exposed surface and an opposite, attachment surface, the exposed surface and attachment surface being bound by a peripheral edge, and
a magnetized material carried by the exposed surface;
a portable power drill comprising:
a drill housing,
a chuck rotationally integrated with the portable power drill,
a battery pack removably engaging with the portable power drill, and
a trigger integrated into the drill, wherein the trigger controls operation of the drill resulting in powered rotation of the chuck,
wherein the magnetized object retention panel is affixed to one of:
an exterior surface of a segment of the drill housing, and
an exterior surface of the battery pack.

In a second aspect, the magnetized object retention panel is affixed to a base segment of the drill housing.

In another aspect, the magnetized object retention panel is affixed to a base surface of the battery pack.

In yet another aspect, the magnetized object retention panel is affixed to a sidewall surface of the battery pack.

In yet another aspect, the magnetized object retention panel is formed and affixed to a front surface and at least one adjacent sidewall surface of the battery pack.

In yet another aspect, the magnetized object retention panel is affixed to one of the drill housing and the battery pack using an adhesive.

In yet another aspect, the magnetized object retention panel is affixed to one of the drill housing and the battery pack using an adhesive.

In yet another aspect, the magnetized object retention panel further comprises an adhesive carried by the attachment surface.

In yet another aspect, the magnetized object retention panel further comprises a plurality of spatially arranged grooves extending inward from the exterior surface of the magnetized exposed surface, wherein the grooves are sized and shaped to facility formation of an arch in the magnetized object retention panel.

In yet another aspect, the magnetized object retention panel further comprises a plurality of spatially arranged grooves extending inward from the exterior surface of the magnetized exposed surface, wherein the grooves are parallel to one another.

In yet another aspect, the magnetized object retention panel further comprises a plurality of spatially arranged grooves extending inward from the exterior surface of the magnetized exposed surface, wherein the grooves are parallel to one another and extend between longitudinal edges thereof.

In yet another aspect, the magnetized object retention panel further comprises a plurality of spatially arranged grooves extending inward from the exterior surface of the magnetized exposed surface, wherein the grooves are parallel to one another and extend perpendicularly between a pair of parallel longitudinal edges thereof.

In yet another aspect, each of the plurality of spatially arranged grooves are formed having a "V" shaped channel.

In yet another aspect, each of the plurality of spatially arranged grooves are formed having a rounded or "U" shaped channel.

In a second embodiment, the magnetized object retention member is provided as a magnetized item retention channel, the magnetized item retention channel comprising:

a channel basewall having an exposed surface and an opposite, attachment surface, and a magnetized material carried by the exposed surface, at least one channel sidewall extending generally perpendicular from a respective longitudinal edge, the at least one channel sidewall terminating at a channel base surface, wherein a height of the at least one channel sidewall extending between the channel basewall exposed surface and the channel base surface is greater than a transverse dimension of an anticipated retained object.

In another aspect, the height of the at least one channel sidewall is at least ¼".

In another aspect, the height of the at least one channel sidewall is at least ½".

In another aspect, the height of the at least one channel sidewall is between ¼" and ½".

In another aspect, the height of the at least one channel sidewall is less than F.

In another aspect, the magnetized item retention channel further comprises a magnetized material carried by an inner surface of the at least one channel sidewall.

In yet another aspect, the magnetized item retention channel further comprises an adhesive carried by the attachment surface.

In yet another aspect, the magnetized item retention channel further comprises a pair of channel sidewalls, each channel sidewall extending generally perpendicular from a respective longitudinal edge, each of the pair of channel sidewalls terminating at a channel base surface.

In yet another aspect, heights of each of the pair of channel sidewalls are equal to one another, resulting in the respective channel base surfaces forming a plane.

In yet another aspect, the magnetized item retention channel is affixed to a base segment of the drill housing.

In yet another aspect, the magnetized item retention channel is affixed to a base surface of the battery pack.

In yet another aspect, the magnetized item retention channel is manufactured of a flexible material, including nylon, silicone, plastic, and the like.

In yet another aspect, the magnetized item retention channel is manufactured of an elastic material, including rubber, and the like.

In yet another aspect, the magnetized item retention channel is manufactured of a metallic material, including steel, aluminum, and the like.

In yet another aspect, the magnetized item retention channel is manufactured of a metallic material, including steel, aluminum, and the like.

In yet another aspect, the magnetized material is applied upon the exposed surface.

In yet another aspect, the magnetized material is a secondary material applied to the exposed surface of the magnetized item retention channel.

In yet another aspect, the magnetized material is a sheet of material adhered to the exposed surface of the magnetized item retention channel.

In yet another aspect, the magnetized material is integrated into material used to form the magnetized item retention channel.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
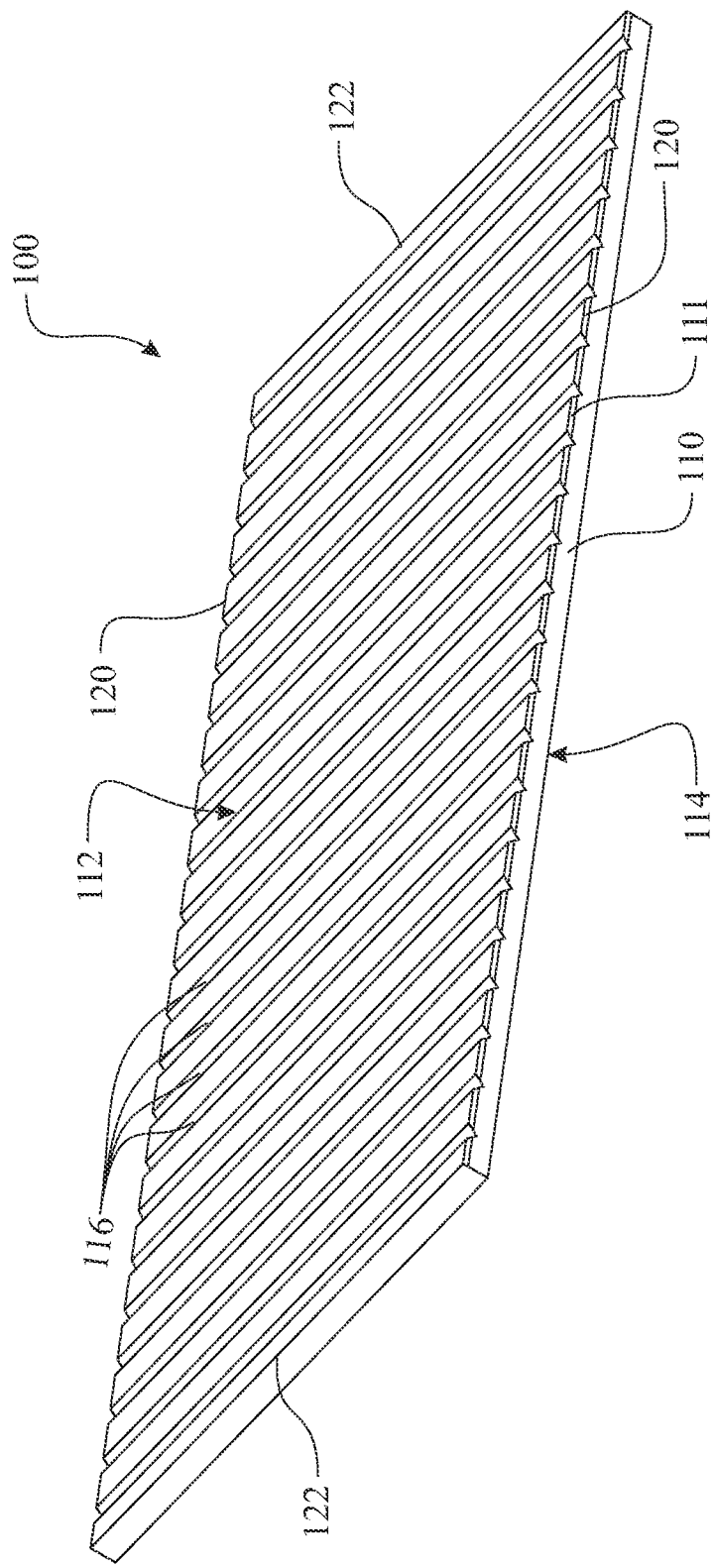
FIG. 1 presents an isometric view detailing a magnetized surface side of an exemplary magnetized object retention panel.
Figure 2:
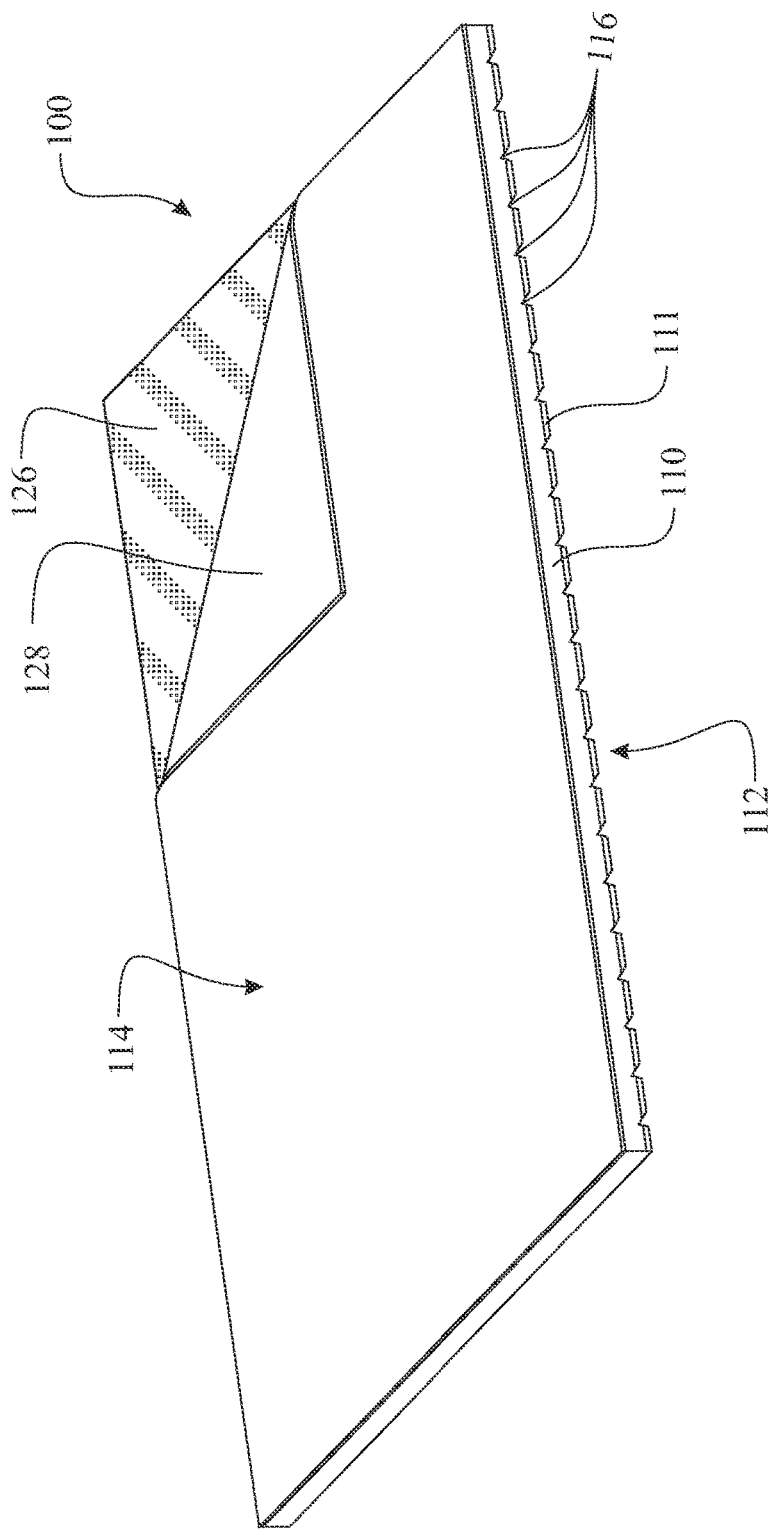
FIG. 2 presents an isometric view detailing an attachment surface side of the magnetized object retention panel originally introduced in FIG. 1.
Figure 3:
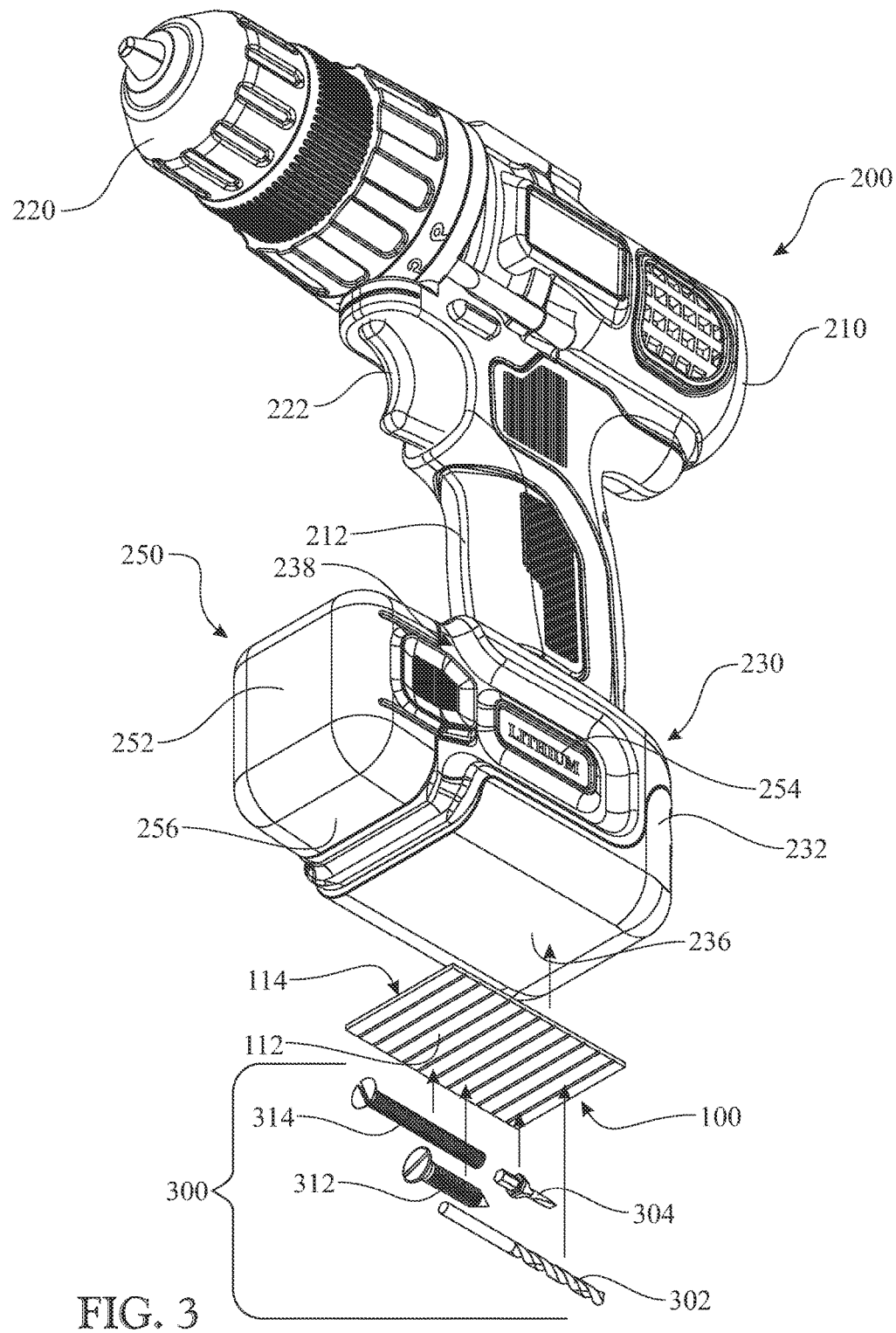
FIG. 3 presents an isometric exploded assembly view illustrating a first embodiment for attaching the magnetized object retention panel originally introduced in FIG. 1 onto a base portion of a portable powered drill.
Figure 4:
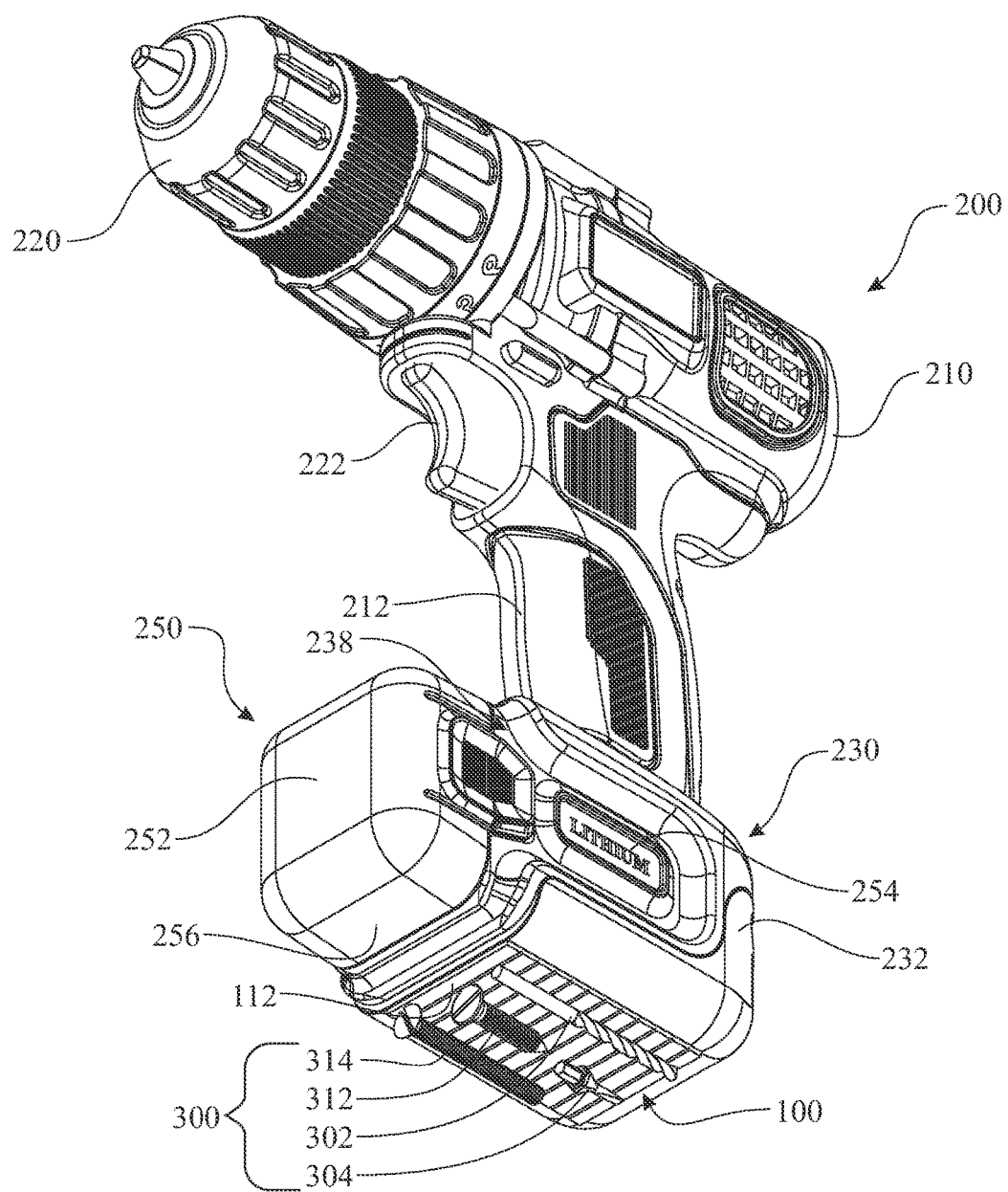
FIG. 4 presents an isometric view illustrating a variety of objects being temporarily retained by the magnetized object retention panel affixed to the base portion of the portable powered drill.
Figure 5:
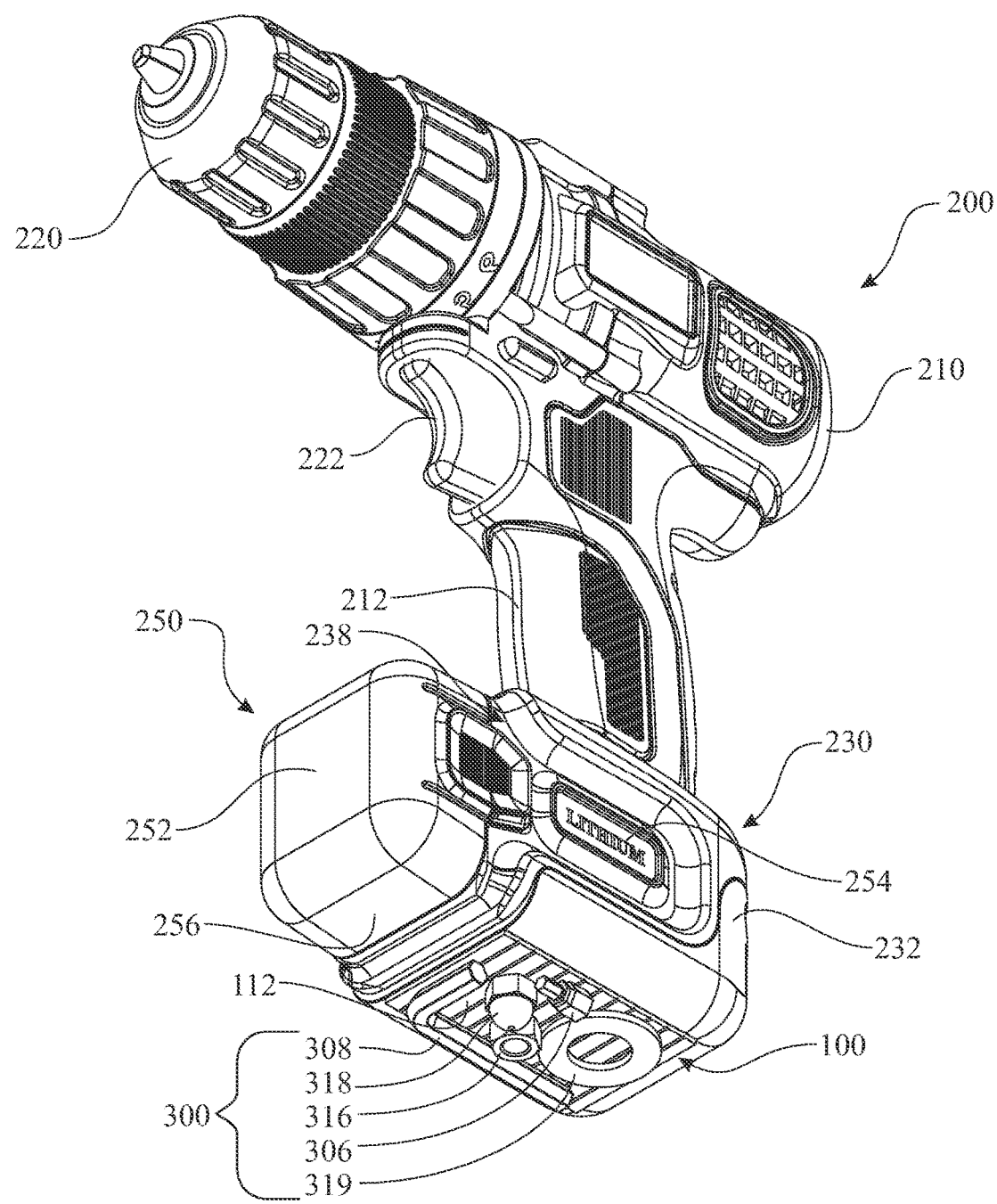
FIG. 5 presents an isometric view illustrating a second variety of objects being temporarily retained by the magnetized object retention panel affixed to the base portion of the portable powered drill.

A magnetized object retention panel 100 is introduced in FIGS. 1 and 2 for attachment to a portable power drill 200 as illustrated in FIGS. 3 through 7. The exemplary magnetized object retention panel 100 is fabricated of a magnetized substrate 110 having a magnetic material 111 carried upon a magnetized exposed surface 112 and an adhesive 126 carried upon an adhesive attachment surface 114. The magnetized substrate 110 is manufactured using a flexible material, such as flexible plastic, rubber, paper, vinyl, polypropylene laminates, and any other suitable flexible material. It is understood that the magnetized substrate 110 can be manufactured using a semi-rigid or rigid material, such as plastic, metal, and the like for more limited applications. The magnetic material 111 is laminated onto the magnetized exposed surface 112. Alternatively, the magnetized substrate 110 can be manufactured using a flexible resin or binder such as vinyl, integrating the magnetic material 111 into the magnetized substrate 110 as a unitary sheet. An adhesive 126 can be applied to the adhesive attachment surface 114 of the magnetized substrate 110 for affixing the magnetized object retention panel 100 to the portable power drill 200. The adhesive 126 is protected by a backing member 128 until application onto the portable power drill 200. Alternatively, the adhesive attachment surface 114 can be left having a natural finish, passing options for a method of attachment to the installer. A series of grooves 116 can be formed into the magnetized exposed surface 112 using any suitable known process. The series of grooves 116 can be formed using any of: a machining process, a cutting process, a compression process, or the like. Each of the series of grooves 116 can have any reasonable shape, including a "V" shaped scoring, a "U" shaped scoring, a square or rectangular shaped scoring, and the like. The series of grooves 116 are preferably arranged having an equally spaced parallel relationship. It is understood that the series of grooves 116 can be arranged having any spatial relationship, wherein each of the series of grooves 116 can span between opposing longitudinal edges 120 of the magnetized substrate 110. The series of grooves 116 are preferably arranged being perpendicular to each of opposing parallel longitudinal edges 120.

In one variant, a second series of grooves (not shown) can be formed extending into the magnetized substrate 110 from the magnetized exposed surface 112, wherein the second series of grooves have an angled relation respective to the grooves 116. In one variant, the second series of grooves can be perpendicular to the first series of grooves 116, extending between lateral edges 122. The second series of grooves would be arranged in a manner similar to the arrangement of the first series of grooves 116.

Details of the portable power drill 200 are disclosed, wherein the elements of the portable power drill 200 will be helpful when describing the method of affixing the magnetized object retention panel 100 to the portable power drill 200. Details of the portable power drill 200 and several exemplary configurations for adhering the magnetized object retention panel 100 to the portable power drill 200 are presented in FIGS. 3 through 7. The portable power drill 200 includes a drill housing 210, wherein the drill housing 210 includes features to support components utilized to complete the portable power drill 200. A drill handgrip 212 can be integrated into the drill housing 210 forming a unitary structure. The drill housing 210 is commonly designed having two (2) sections: a left-half shell and a right-half shell. Operational components, including an electric motor, a transmission, a chuck driveshaft, any associated electrical components, and an optional clutch are assembled directly or indirection to the drill housing 210. A chuck 220 is rotationally adapted to the chuck driveshaft. A battery receiving section 230 can be combined into a lower end of the drill handgrip 212 as a unitary structure or manufactured as a separate unit and subsequently assembled to a lower end of the drill handgrip 212. It is understood that the battery receiving section 230 can be designed having any suitable shape. The exemplary battery receiving section 230 includes a battery receptacle 232 having a "C" shaped design forming a battery receiving cavity 238 for receiving a battery pack 250 in a horizontal direction (perpendicular to a longitudinal direction of the drill handgrip 212). The battery receptacle 232 provides a drill housing base surface 236. In an alternative embodiment, the battery receiving section 230 is formed at a lower, base or distal region of the drill handgrip 212, wherein the battery receiving section 230 receives the battery pack 250 in a vertical or upward direction (parallel to the longitudinal direction of the drill handgrip 212). Electrical contacts are integrated into the battery receiving section 230 for engaging with mating electrical contacts provided on the battery pack 250. A trigger 222 is assembled to the drill housing 210, providing a user with a means for controlling operation of the portable power drill 200. The trigger 222 is integrated into an electrical circuit in conjunction with the electrical contacts, the motor, and electrical conductors or wires. It is noted, common components assembled within an interior of the drill housing 210 of the portable power drill 200 (such as the motor, transmission, electrical contacts, wiring, and the like) are not illustrated, as they are well known by those skilled in the art.

The magnetized object retention panel 100 can be affixed to the portable power drill 200 at any suitable location. Several exemplary installations are presented in FIGS. 3 through 7, with others being described herein. In a first exemplary installation, the adhesive attachment surface 114 of the magnetized object retention panel 100 is affixed to an exposed lower surface of the portable power drill 200, wherein the specific feature would be defined by the configuration of the battery receiving section 230. In the illustrated configuration (FIGS. 3 through 5), the exposed lower surface of the portable power drill 200 is a drill housing base surface 236. In an alternative configuration, where the battery pack bottom surface 256 is the exposed lower surface, the adhesive attachment surface 114 of the magnetized object retention panel 100 would be affixed to the battery pack bottom surface 256.

Any magnetically attractable object 300 can be retained by the magnetic material 111 of the magnetized object retention panel 100. The magnetically attractable objects 300 can include, but are not limited to, drill bits 302, screw driver bits 304, hex driver bits 306, hex key or Allen wrenches 308, screws 312, bolts 314, hex nuts 316, acorn nuts 318, washer 319, and the like. The magnetized material would be selected having a magnetic strength suitable for retaining the magnetically attractable objects 300 thereon during common use of the portable power drill 200.

The magnetized object retention panel 100 can be affixed to the respective portion of the portable power drill 200 using any suitable attachment process, including mechanical devices, adhesive and the like. In the exemplary embodiment, an adhesive 126 is applied to the adhesive attachment surface 114. The adhesive 126 is protected by a backing member 128 applied thereon and only removed as a precursor to an adhesion step. In an alternative embodiment, the magnetized object retention panel 100 can be affixed to the respective portion of the portable power drill 200 by applying any suitable adhesive to the adhesive attachment surface 114 and/or the respective portion of the portable power drill 200. The magnetized object retention panel 100 would then be positioned contacting the respective portion of the portable power drill 200 and retained in position until the adhesive sets/cures. The adhesive can be a one-part composition, a two-part composition, or a multi-part composition. In another alternative embodiment, the magnetized object retention panel 100 can be affixed to the respective portion of the portable power drill 200 by sandwiching a sheet of double-sided tape between the adhesive attachment surface 114 and the respective portion of the portable power drill 200. In yet another embodiment, the magnetized object retention panel 100 can be affixed to the respective portion of the portable power drill 200 by mechanically fastening the adhesive attachment surface 114 to the respective portion of the portable power drill 200. The mechanical fasteners can be screws, rivets, clips, wire, and the like.

The magnetized object retention panel 100 can be manufactured of a material that can be sheered using scissors or other manual, generally available cutting device. The material is selected enabling the magnetized object retention panel 100 to be sized by the installer to fit the selected installation location on the portable power drill 200. The corners of the magnetized object retention panel 100 can be rounded (as shown in FIGS. 6 and 7) to improve reliability, longevity of adhesion to the portable power drill 200, reduction of potential injury to the user, and the like.

Figure 6:
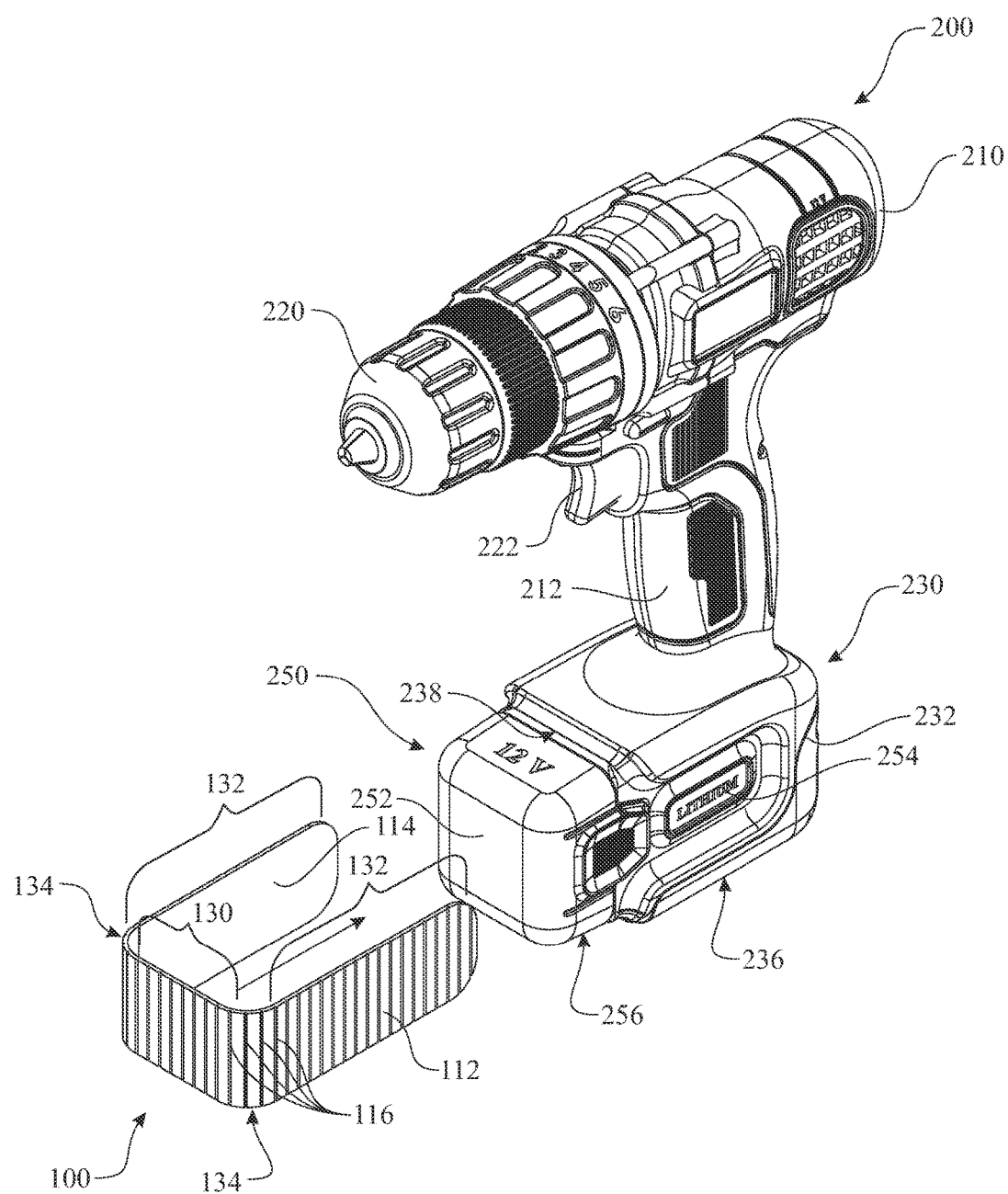
FIG. 6 presents an isometric exploded assembly view illustrating a second embodiment for forming and attaching the magnetized object retention panel onto a plurality of sidewalls of an exemplary battery pack employed to provided power to the portable powered drill.
Figure 7:
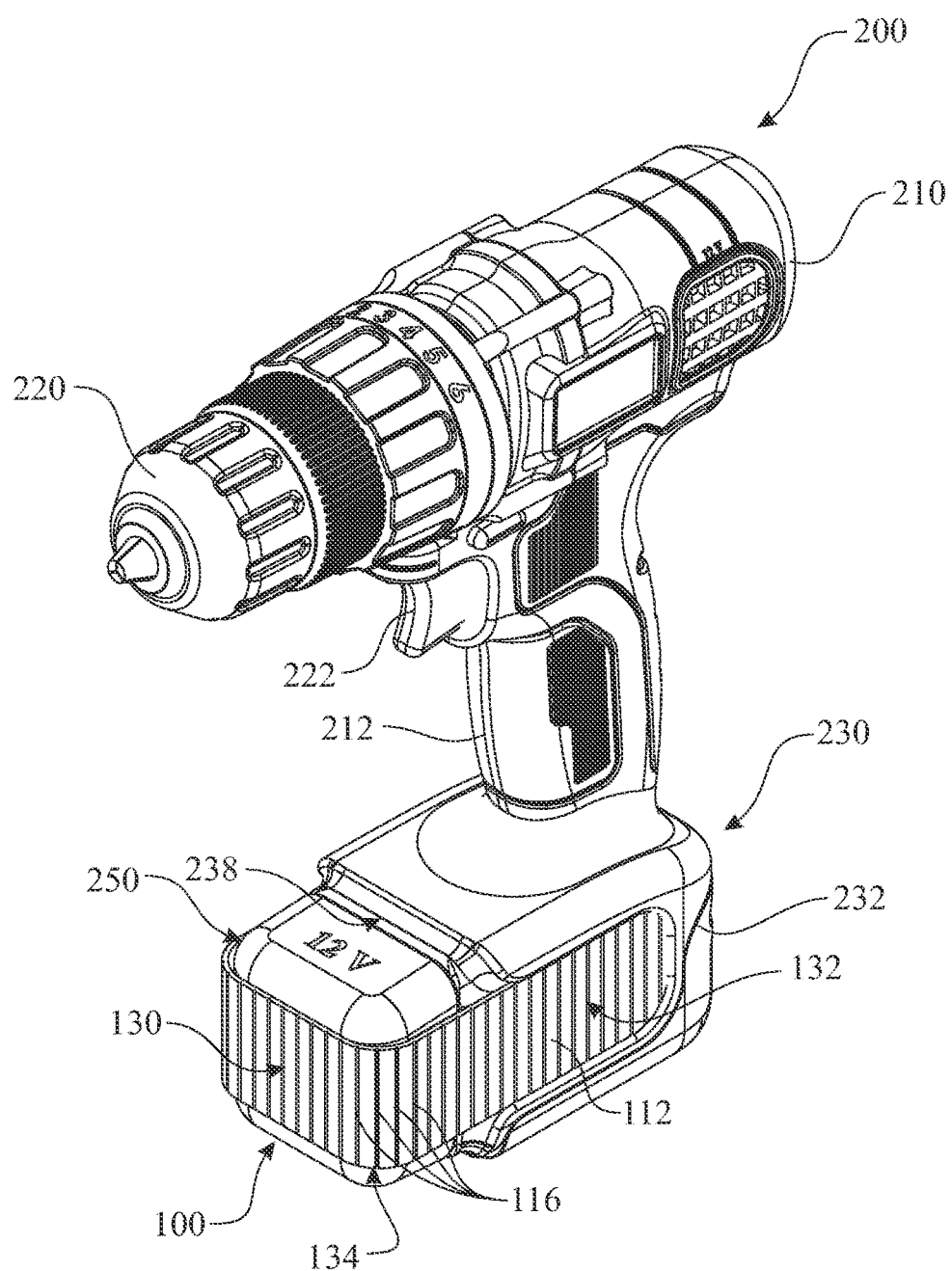
FIG. 7 presents an isometric view illustrating the second attachment embodiment wherein the magnetized object retention panel is affixed to the plurality of sidewalls of the exemplary battery pack employed to provided power to the portable powered drill.

In a second exemplary installation, the magnetized object retention panel 100 is formed to contour to a selected exterior surface of the portable power drill 200; in this case, an exterior surface of the battery pack 250, as illustrated in FIGS. 6 and 7. The target surface for applying the magnetized object retention panel 100 can be one or more linearly contiguous surfaces. The series of grooves 116 formed within the magnetized substrate 110 enables a formation of one or more bends or arches therein. In the exemplary embodiment, the magnetized object retention panel 100 is affixed to a battery pack front surface 252 and a pair of adjacent battery pack side surfaces 254. The magnetized substrate 110 can be shaped prior to or during the attachment process. The magnetized substrate 110 is bent forming a pair of arched segments 134, segmenting the magnetized substrate 110 into a front attaching segment 130 and a pair of side attaching segments 132. The arched segment 134 would be located and shaped to correspond to like corners on the respective receiving surface, in this case, the respective corners of the battery pack 250. The magnetized object retention panel 100 can be affixed to the portable power drill 200 in any suitable manner. In one process, the magnetized object retention panel 100 is aligned by placing the arched segment 134 against a respective corner of the battery pack 250, the side attaching segment 132 is affixed to the respective battery pack side surface 254, the front attaching segment 130 is affixed to the battery pack front surface 252, and the remaining side attaching segment 132 is affixed to the other respective battery pack side surface 254. In a second process, a center of the magnetized object retention panel 100 is aligned with a center of the battery pack front surface 252 and affixed in position. The magnetized substrate 110 is bent, forming an arched segment 134 around the respective corner of the battery pack 250, segmenting the magnetized substrate 110 into the front attaching segment 130 and the side attaching segment 132. The first side attaching segment 132 is wrapped about the battery pack 250 and affixed to the respective battery pack side surface 254. The second side attaching segment 132 is wrapped about another side of the battery pack 250 and affixed to the other respective battery pack side surface 254. It is also understood that the magnetized object retention panel 100 can be cut to an applicable size and affixed to the associated portion of the portable power drill 200 as desired. Although the exemplary embodiment illustrates attaching the magnetized object retention panel 100 to the battery pack 250, it is understood that the magnetized object retention panel 100 can be adhered to any suitable surface or surfaces of the drill housing 210, and more specifically, portions of the battery receiving section 230.

Figure 8:
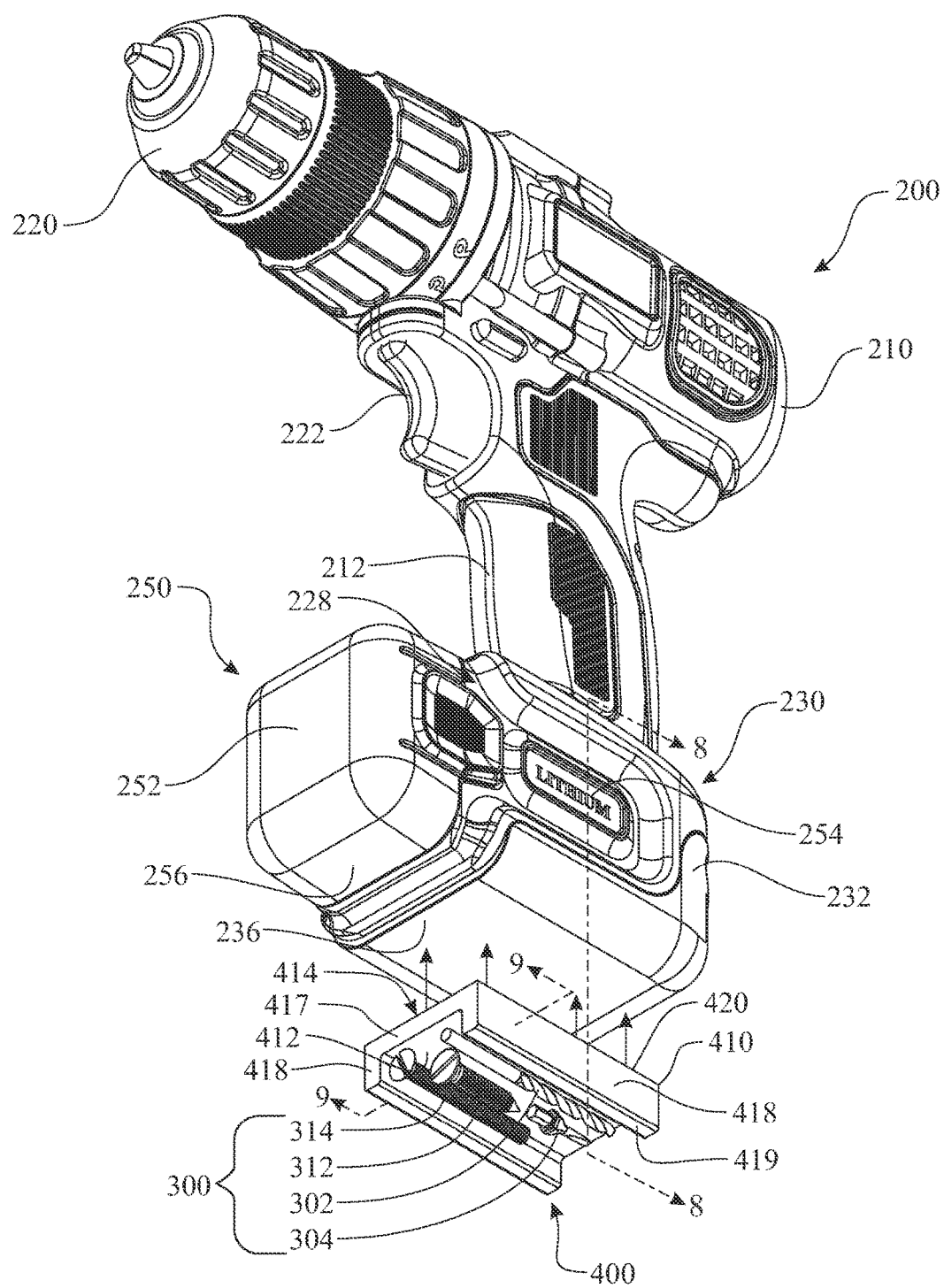
FIG. 8 presents an isometric exploded assembly view of an exemplary embodiment of a magnetized item retention channel carrying the variety of objects being affixed to the base portion of a portable powered drill.
Figure 9:
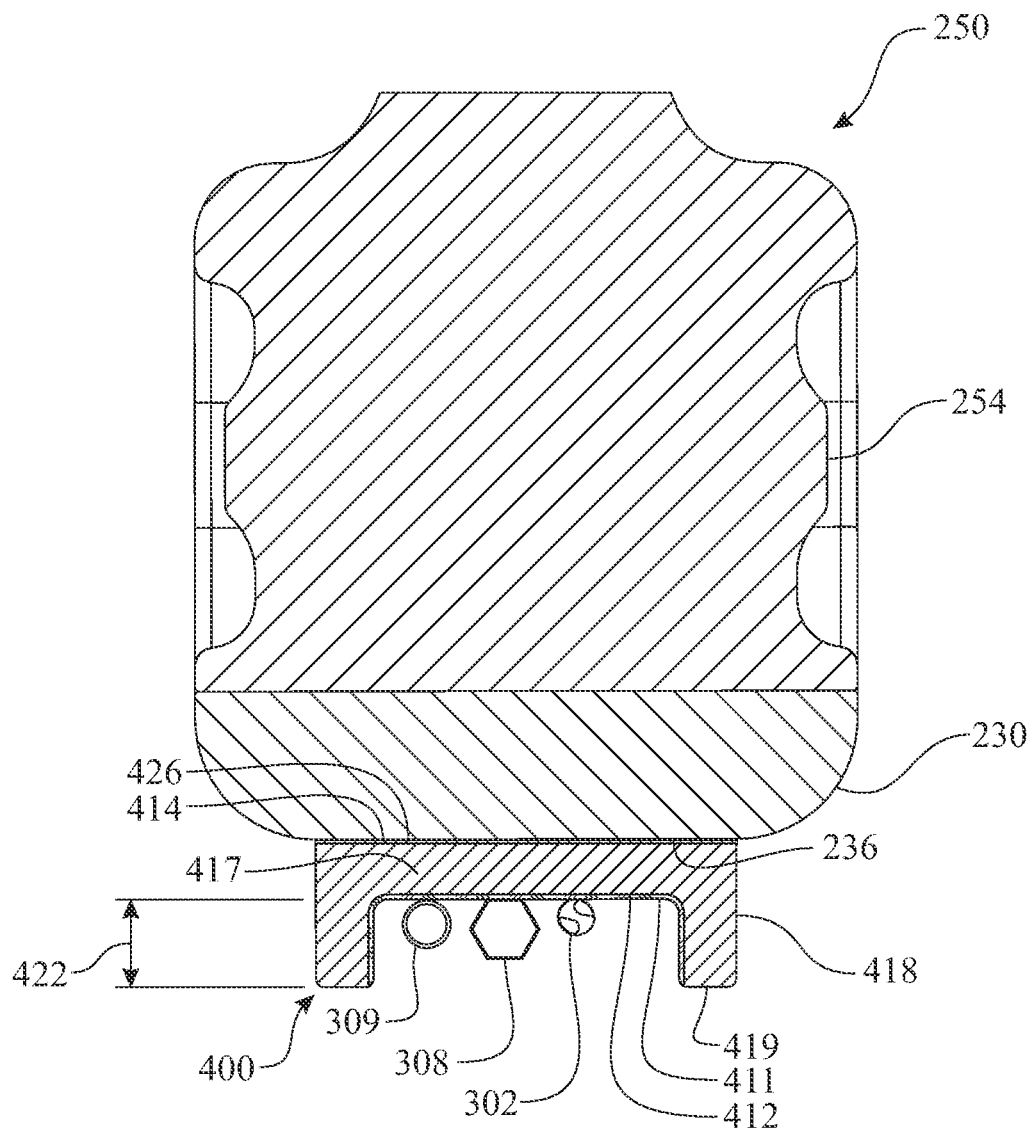
FIG. 9 presents cross section view of the magnetized item retention channel introduced in FIG. 8, the section taken along section line 9-9 of FIG. 8.

A magnetized item retention channel 400 is an alternative embodiment to the magnetized object retention panel 100, wherein the magnetized item retention channel 400 is detailed in FIGS. 8 and 9. The magnetized item retention channel 400 provides the general benefits of the magnetized object retention panel 100, while introducing other benefits. The magnetized item retention channel 400 is manufactured having a magnetized channel 410 segmented into a substantially planar channel basewall 417 and at least one channel sidewall 418 extending generally perpendicularly from a respective longitudinal edge 420, the at least one channel sidewall 418 terminating at a channel base surface 419. In a preferred embodiment, the magnetized item retention channel 400 includes a pair of channel sidewalls 418, each channel sidewall 418 extending generally perpendicular from a respective longitudinal edge 420, each of the pair of channel sidewalls 418 terminating at a respective channel base surface 419. Each channel sidewall 418 has a channel sidewall height 422 extending between the channel basewall exposed surface and the channel base surface. The channel sidewall height 422 is designed to accommodate a transverse dimension of an anticipated retained object 300. In a first variant, the channel sidewall height 422 is at least ½". In a second variant, the channel sidewall height 422 is between ¼" and ½". In a third variant, the channel sidewall height 422 is between ¼" and ¾". In a fourth variant, the channel sidewall height 422 is between ½" and F. In a fifth variant, the channel sidewall height 422 is less than F. In a sixth variant, the channel sidewall height 422 is between ½" and 1½". In a seventh, the channel sidewall height 422 is between ¾" and 1½". The height can be determined by the target application. A magnetized item retention channel 400 designed for a larger powered drill 200 would include the channel sidewalls 418 having a taller height compared to a magnetized item retention channel 400 designed for a lesser-powered drill 200. The theory is based upon the concept where the larger powered drill 200 is designed to utilize and install larger diameter objects 300 compared to the lesser-powered drill 200, therefore, the taller height would accommodate objects 300 having a larger diameter.

In a variant comprising a pair of channel sidewalls 418, it would be preferred where each channel sidewall 418 has the same channel sidewall height 422. In this configuration, the pair of channel base surface 419 defines a plane, wherein the channel base surface 419 can support the portable power drill 200 when the channel base surface 419 is placed against a level, planar surface.

The magnetized item retention channel 400 can be manufactured using any suitable manufacturing process, including injection molding, extruding, machining, and the like. The key operative components are integrated into the magnetized channel 410 and employed as follows: An adhesive 426 would be applied to an adhesive attachment surface 414 of the channel basewall 417. The adhesive would be applied in accordance with any of the embodiments previously described in the application of the magnetized object retention panel 100. The adhesive 426 is employed to affix the magnetized item retention channel 400 to the portable power drill 200, and more specifically a base or lower surface of the portable power drill 200. The base or lower surface can be the drill housing base surface 236 as illustrated or the battery pack bottom surface 256 in an alternative configuration. A magnetic material 411 is either applied to an exposed surface 412 of the magnetized channel 410 or integral with the material forming the magnetized channel 410. Like the magnetic material 111, the magnetic material 411 is used to retain magnetic objects 300 within an interior portion of the magnetized item retention channel 400. Magnetic objects 300 are retained within a cavity defined by interior surfaces of the channel basewall 417 and channel sidewall 418 by the magnetic material 411, as illustrated in FIGS. 8 and 9. In a condition where the magnetic objects 300 are exposed, an external object may accidentally contact the magnetic objects 300, dislodging the magnetic objects 300 from the magnetic material 411. The channel sidewall 418 aids in retaining the magnetic objects 300 within the interior of the channel by providing a barrier between any external object and the magnetic objects 300 retained within the cavity of the 400.

The pair of channel sidewalls 418 provides an additional advantage, wherein the pair of channel sidewalls 418 can be used to support the portable power drill 200 in an upright configuration. The channel sidewall 418 shadows the magnetic objects 300 within the interior of the channel. As previously mentioned, the channel sidewall height 422 is designed to accommodate a transverse dimension of an anticipated retained object 300. This feature is designed to result in the channel base surface 419 being the farthest surface from the magnetized exposed surface 412, thus enabling the channel base surface 419 to contact a supporting surface. The pair of channel base surfaces 419 defines a plane, wherein when placed on the supporting surface; the pair of channel base surfaces 419 stands the portable power drill 200 in an upright orientation.

Although the preferred embodiment orients each channel sidewall 418 being perpendicular to the channel basewall 417, it is understood that each channel sidewall 418 can be angled respective to the channel basewall 417. Each channel sidewall 418 can be angled outward creating a broader stance for supporting the portable power drill 200. Alternatively, the channel sidewall 418 can be centrally located extending downward from a central portion of the channel basewall 417. Any or all of the exposed surfaces of the channel sidewalls 418 can carry a magnetized material enabling retention of any objects which contain a magnetic material.

Grooves or channels, similar to the grooves 116 above, can be formed within the channel basewall 417, allowing some flexure for conforming to a non-planar surface.

Although the above described embodiments present an accessory that is subsequently affixed to a drill or other portable tool, it is understood that the magnetized material can be integrated into the housing of the drill or portable tool or the casing of the battery pack.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. An accessory attached to a portable power drill, the combination comprising:
   a magnetized item retention channel comprising:
      a channel basewall having an exposed surface and an opposite, attachment surface said channel basewall bound by peripheral edge, and
      a magnetized material carried by said channel basewall,
      at least one channel sidewall extending generally perpendicular from a respective longitudinal edge, said at least one channel sidewall terminating at a channel base surface having a height defined as a distance extending between a channel basewall exposed surface and said channel base surface each at least one channel sidewall extending in a longitudinal direction between a first end and a second end,
      wherein a gap is provided along said peripheral edge between said first channel sidewall end and said second channel sidewall end,
      wherein a height of said at least one channel sidewall extending between said channel basewall exposed surface and said channel base surface is greater than a transverse dimension of an anticipated retained object; and
   a portable power drill comprising:
      a drill housing,
      a chuck rotationally integrated with said portable power drill,
      a battery pack removably engaging with said portable power drill, and
      a trigger integrated into said drill, wherein said trigger controls operation of said drill resulting in powered rotation of said chuck,
   wherein said magnetized item retention channel is affixed to one of:
      an exterior surface of a segment of said drill housing, and
      an exterior surface of said battery pack.

2. An accessory and portable power drill combination as recited in claim 1, said magnetized item retention channel further comprises an adhesive carried by said attachment surface.

3. An accessory and portable power drill combination as recited in claim 1, wherein said magnetized item retention channel is affixed to a bottom surface of said drill housing.

4. An accessory and portable power drill combination as recited in claim 1, wherein said magnetized item retention channel is affixed to a bottom surface of said battery pack.

5. An accessory and portable power drill combination as recited in claim 1, said magnetized item retention channel further comprises a pair of each channel sidewalls extending generally perpendicular from a respective longitudinal edge, each of said pair of channel sidewalls terminating at a respective channel base surface.

6. An accessory and portable power drill combination as recited in claim 5, wherein said heights of each of said pair of channel sidewalls are equal to one another, resulting in the respective channel base surfaces forming a plane.

7. An accessory and portable power drill combination as recited in claim 5, wherein said heights of each of said pair of channel sidewalls is at least ¼".

8. An accessory adapted to be attached to a portable power drill, the accessory comprising:
- a magnetized item retention channel comprising:
  - a channel basewall having an exposed surface and an opposite, attachment surface said channel basewall bound by a peripheral edge,
  - a magnetized material carried by said channel basewall,
  - at least one channel sidewall extending generally perpendicular from a respective longitudinal edge, said at least one channel sidewall terminating at a channel base surface having a height defined as a distance extending between a channel basewall exposed surface and said channel base surface each at least one channel sidewall extending in a longitudinal direction between a first end and a second end, and
  - a gap provided along said peripheral edge between said first channel sidewall end and said second channel sidewall end,
- wherein a height of said at least one channel sidewall extending between said channel basewall exposed surface and said channel base surface is greater than a transverse dimension of an anticipated retained object.

9. An accessory adapted to be attached to a portable power drill as recited in claim 8, wherein said magnetized item retention channel is affixed to one of:
- an exterior surface of a segment of a drill housing, and
- an exterior surface of a battery pack adapted to power a drill.

10. An accessory adapted to be attached to a portable power drill as recited in claim 8, said magnetized item retention channel further comprises an adhesive carried by said attachment surface.

11. An accessory adapted to be attached to a portable power drill as recited in claim 8, said at least one channel sidewall includes a first channel sidewall and a second channel sidewall, each of said first channel sidewall and said second channel sidewall extending generally perpendicular from a respective longitudinal edge, each of said first channel sidewall and said second channel sidewall terminating at a respective channel base surface, said first channel sidewall extending in a longitudinal direction along said respective longitudinal edge between and terminated at a first channel sidewall first end and a first channel sidewall second end, said first channel sidewall extending in a longitudinal direction along said respective longitudinal edge between and terminated at a second channel sidewall first end and a second channel sidewall second end,
- wherein a first gap is provided along said peripheral edge between each of said first channel sidewall first end, said second channel sidewall first end and a second gap is provided along said peripheral edge between each of said first channel sidewall second end, said second channel sidewall second end.

12. An accessory adapted to be attached to a portable power drill as recited in claim 11, wherein said first channel sidewall and said second channel sidewall are parallel with one another.

13. An accessory adapted to be attached to a portable power drill as recited in claim 10, wherein said heights of each of said first channel sidewall and said second channel sidewall are equal to one another, resulting in said respective channel base surfaces forming a plane.

14. An accessory adapted to be attached to a portable power drill as recited in claim 10, wherein said heights of each of said first channel sidewall and said second channel sidewall is at least ¼".

15. An accessory adapted to be attached to a portable power drill, the accessory comprising:
- a magnetized item retention channel comprising:
  - a channel basewall having an exposed surface and an opposite, attachment surface said channel basewall bound by a peripheral edge, said peripheral edge comprising a first longitudinal edge and a second longitudinal edge, each of said first longitudinal edge and said second longitudinal edge extending between a first lateral edge and a second lateral edge,
  - a magnetized material carried by said channel basewall,
  - a first channel sidewall, said first channel sidewall extending generally perpendicular from said first longitudinal edge, said first channel sidewall terminating at a respective channel base surface, said first channel sidewall extending in a longitudinal direction along said first longitudinal edge, said first channel sidewall extending between a first channel sidewall first end and a first channel sidewall second end, said first channel sidewall first end located proximate said first lateral edge, said first channel sidewall second end located proximate said second lateral edge,
  - a second channel sidewall, said second channel sidewall extending generally perpendicular from said second longitudinal edge, said second channel sidewall terminating at a respective channel base surface, said second channel sidewall extending in a longitudinal direction along said second longitudinal edge, said second channel sidewall extending between a second channel sidewall first end and a second channel sidewall second end, said second channel sidewall first end located proximate said first lateral edge, said second channel sidewall second end located proximate said second lateral edge,
  - a first gap provided along said peripheral edge between each of said first channel sidewall first end, said second channel sidewall first end, and
  - a second gap is provided along said peripheral edge between each of said first channel sidewall second end, said second channel sidewall second end,
- wherein a height of said at least one channel sidewall extending between said channel basewall exposed surface and said channel base surface is greater than a transverse dimension of an anticipated retained object.

16. An accessory adapted to be attached to a portable power drill as recited in claim 15, wherein said magnetized item retention channel is affixed to one of:
- an exterior surface of a segment of a drill housing, and
- an exterior surface of a battery pack adapted to power a drill.

17. An accessory adapted to be attached to a portable power drill as recited in claim 15, said magnetized item retention channel further comprises an adhesive carried by said attachment surface.

18. An accessory adapted to be attached to a portable power drill as recited in claim 15, wherein said first channel sidewall and said second channel sidewall are arranged being parallel to one another.

19. An accessory adapted to be attached to a portable power drill as recited in claim 15, wherein said heights of each of said first channel sidewall and said second channel sidewall are equal to one another, resulting in said respective channel base surfaces forming a plane.

20. An accessory adapted to be attached to a portable power drill as recited in claim 15, wherein said heights of each of said first channel sidewall and said second channel sidewall is at least ¼".

\* \* \* \* \*